United States Patent [19]
O'Brien

[11] Patent Number: 4,481,810
[45] Date of Patent: Nov. 13, 1984

[54] ADJUSTABLE WIND DIRECTION DEVICES

[75] Inventor: William F. O'Brien, Long Valley, N.J.

[73] Assignee: Ketcham & McDougall, Inc., Roseland, N.J.

[21] Appl. No.: 383,894

[22] Filed: Jun. 1, 1982

[51] Int. Cl.³ .................. G01C 21/00; G01C 17/08
[52] U.S. Cl. .................... 73/178 R; 33/364; 116/DIG. 43
[58] Field of Search .............. 33/364, 355 R, 355, 33/350; 73/188, 178 R; 116/264, 265

[56] References Cited

U.S. PATENT DOCUMENTS

| 1,270,178 | 6/1918 | Lehtinen | 33/355 |
| 1,300,602 | 4/1919 | Goddard | 33/350 |
| 2,396,202 | 3/1946 | Reitzer | 33/350 |
| 2,859,725 | 7/1959 | Anderson | 432/119 |
| 3,217,420 | 11/1965 | Dinsmore | 33/355 |
| 3,613,251 | 10/1971 | Fitzpatrick et al. | 33/355 |
| 3,664,292 | 5/1972 | Sherman | 116/114 |
| 3,678,591 | 7/1972 | Selig, Jr. | 33/355 |
| 3,805,400 | 4/1974 | Giltzow et al. | 33/364 |
| 3,824,947 | 7/1974 | Honkaranta et al. | 116/302 |
| 4,149,410 | 4/1979 | Lönnroth | 73/178 R |
| 4,150,491 | 4/1979 | Ansar | 33/355 R |

FOREIGN PATENT DOCUMENTS

| 2447010 | 9/1980 | France | 33/355 |
| 19224 | of 1907 | United Kingdom | 33/355 |

Primary Examiner—Charles Frankfort
Assistant Examiner—W. Morris Worth
Attorney, Agent, or Firm—Edwin E. Greigg

[57] ABSTRACT

This invention sets forth a wind tracking device particularly useful on sailing vessels for determining the best sailing direction relative to the wind. The reference card is provided with color panels which cooperate with lines on the dome to indicate best direction. Further, the card has circular lines about the axis which cooperate with a dot on the axis of the dome to indicate a 360° level condition around a horizontal plane.

2 Claims, 12 Drawing Figures

ADJUSTABLE WIND DIRECTION DEVICES

BACKGROUND OF THE INVENTION

This invention relates to an adjustable wind tracking device which will aid a sailor in taking advantage of the wind direction by aligning the boat in the most efficient angle of sail.

Compass devices for sailing large ships as well as small sailboats have been provided for indicating direction relative to North and for aiding one in steering his boat. Compasses have been made with aids such as magnifiers, card dampers, cross bars, grids, tack indexes, etc. Some of the prior art patents are listed as follows: U.S. Pat. Nos. 2,396,202; 2,859,725; 3,217,420; 3,613,251; 3,678,591; 3,824,947; 4,149,410; 4,150,491.

SUMMARY OF THE INVENTION

This invention sets forth a wind tracking device which may be secured to a sailing vessel in a position where the device can be seen in any wind condition or helm position. The device indicates to the sailor if he is sailing too high or too low on any windward beat. The device pinpoints the most efficient angle of sailing downwind. It indicates when the sailor should tack to avoid a header. It indicates when the sailor should stay on tack to take advantage of a lifter and it will aid the sailor in keeping his boat or vessel level downwind or maintaining a specific angle of heel or any angle of sail, using (360° around a horizontal plane) heel/level indicator included within.

Other objects and advantages of the device will become obvious from the description of the drawings.

Figure 1:
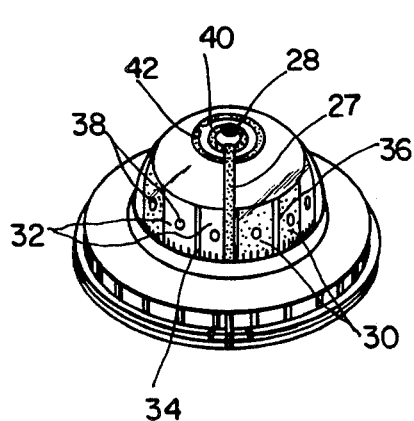
FIG. 1 illustrates perspective view of the wind tracking device.

Now referring to the drawings there is illustrated a wind tracking device including a swivel plate providing a swivel for rotation of the wind tracking device including a base 10 which includes an axially aligned pivot 12 which provides a pivot point 14 near the bottom plane of the base. A reference card 16 includes a top portion 18 shaped as a spherical section with a downwardly extending skirt 20. The skirt extends downward toward the base and surrounds a portion of the pivot. The reference card is provided with a downwardly extending pivot pin which has an end portion thereof that extends below the skirt 20 so that the skirt surrounds a portion of the pivot 12. Spacing is provided around the pivot which permits the reference card to remain in a vertical position even though the vessel is not on a horizontal without the reference card skirt hitting the base.

The reference card carries at least one earth magnetic pole seeking permanent magnet, such as is well known in the art. The reference card is enclosed by a transparent dome or bowl 24 of semi-spherical shape which surrounds the reference card and which is sealed to the base to prevent a reference card rotational damping fluid 26 from leaking from the device. The damping fluid and the low pivot point of the reference card produce a negative buoyancy in the vertical direction for the reference card. The reference card is free to rotate on the pivot point within the dome 24. The dome 24 is provided with one or more heavy reference lines or indicator line 27 permanently affixed to the dome. The line may extend from the base to within a short distance from the center axis with a dot 28 placed on the axis of the dome.

The reference card is provided with alternate color panels such as red 30 and white 32 so that each color panel occupies a 45 degree segment on the circumference of the skirt section of the reference card. Each color panel 30 and 32 is provided with a heavy black centerline 34 and 36 which occurs every 45 degrees in order to separate each different color panel into two equal panels of 22½ degrees. A black dot 38 appears in each color segment every 22½ degrees, left and right, from the heavy black centerlines 45 degrees from each other. The spherical segment section of the reference card is provided with two or more circles 40, 42 affixed thereon in any desired color so that the circles are concentric with the axis and spaced at 10°, 20° or any other appropriate spacing relative to the centerline or axis. The circles are used to maintain a level position of the vessel by checking the relative position of the center dot on the dome with that of the circles. The vessel will be level if the dot on the dome centers on the circles. Materials may be selected to minimize parallax.

On a different model the card could also be provided with an indicia in degrees which is superimposed onto the skirt section so that the device may be used to determine the heading relative to North.

Figure 2:
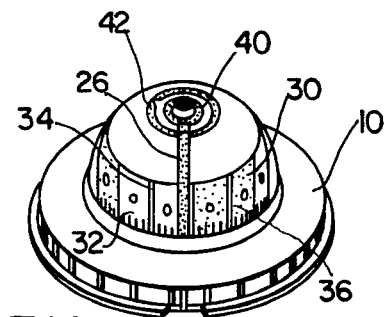
FIG. 2 illustrates the wind tracking device and mounting therefor.

The wind tracking device (FIG. 2) is mounted on a fixed annular ring or base plate 44 by placing the body of the device onto the ring so that the wind tracking device may be rotated 360° by hand. The base plate is provided with a foam disk 46 that fits onto the bottom 48 of the base plate which secures the base plate to the surface; as an alternate, it can be secured by use of four nonmagnetic bolts or screws 50.

Figure 2A:
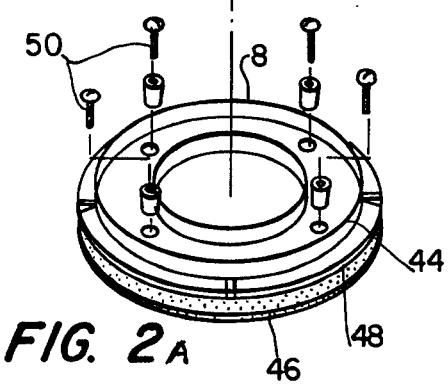
FIG. 2A illustrates base plate and optional foam disk or screw mounting approaches.
Figure 3:
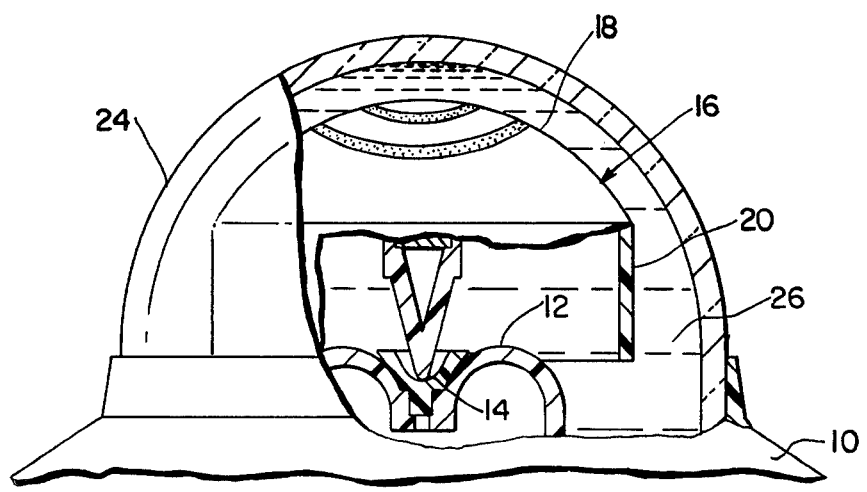
FIG. 3 illustrates a partial view illustrating the relative parts.

In mounting the wind tracking device, the first step is to locate the proper position where it can be seen from any sailing or helm position. A level position may be determined by looking at the dot on the dome relative to the circles on the reference card while the boat is in a normal level position in the water. The device should be separated from the base plate 44 and the base plate is secured to the vessel by use of the non-magnetic screws 50 or the foam disk 46. The wind tracking device may then be secured back on the base plate by snapping the device (FIG. 2) onto its base plate 44 (FIG. 2A). The device is then hand rotatable relative to the base plate for alignment of the wind tracking device.

The wind tracking device aids one in determining the most efficient upwind and downwind sailing angle. The most efficient setting is obtained as follows: Head the vessel directly into the wind. Turn the base until the large black line on the dome aligns with one of the centerlines of the nearest whole color panel, the centerline being the line between side-by-side color segments of the same color. The setting then will be in the optimum sailing position to track wind shifts, as long as the basic wind direction remains the same. With the above setting, all of the windward and downwind courses will be sailed with the movable indicator line in the same color panel or opposite (180°) panel of the same color.

Figure 4:
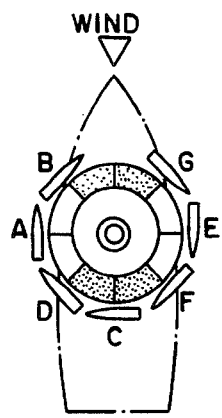
FIG. 4 illustrates the direction of the wind relative to different boat positions.
Figure 4A:
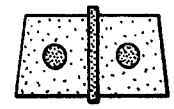
FIGS. 4a–4g illustrate the wind tracking device position for the different positions of the boats shown in FIG. 4.
Figure 4B:
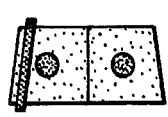
Figure 4C:
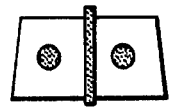
Figure 4D:
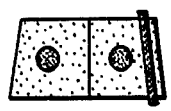
Figure 4E:
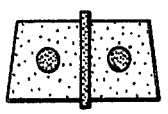
Figure 4F:
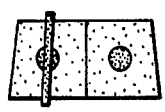
Figure 4G:
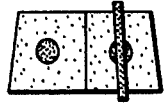

FIG. 4 illustrates a vessel in phantom headed into the wind (with different vessel headings represented by the small vessels shown around a reference card) which shows the centerline of one of the red color panels aligned with the wind direction. The small vessels represent, by letter, the different headings of the different vessels as depicted in FIGS. 4a–4g. Vessel A and FIG. 4a indicate the vessel is heading into the wind with the indicator line centered on the center line of the red color panel. Vessel B and FIG. 4b represent a port tack relative to the setting of FIG. 4a. Vessel C, FIG. 4c, represents a beam reach with reference to the setting of FIG. 4a. Vessel D, FIG. 4d, represents a starboard tack relative to the setting of FIG. 4a. Vessel E, FIG. 4e, represents a dead downwind relative to the card setting of FIG. 4a. Vessel F, FIG. 4e, represents a downwind starboard relative to the setting in FIG. 4a, and Vessel G, FIG. 4g, represents a downwind port relative to the setting of the card shown in FIG. 4a.

It can be seen from the above that the different vessel positions relative to the wind direction can be easily determined by use of the different color panels of the wind tracking device. Further, since the pivot point of the card is near the bottom plane of base and the card is designed to remain in a vertical position, the card can be easily seen even though the vessel may be at a large angle relative to a horizontal plane. The angle can be determined by use of the relative position of the dot on the dome with that of the circles on the card. The circles can also be on the dome and dot on the card. The refractive index of the materials selected provides accurate angle information from almost any viewing angle.

Since the base plate is secured to the vessel and the base of the wind tracking device snap-fits onto the base plate, the wind tracking device may be removed from the vessel when not in use to avoid anyone from unauthorized use of the wind tracking device.

What is claimed and desired to be secured by Letters Patent of the United States is:

1. An adjustable wind tracking device for sailing vessels comprising:
   a base;
   a pivot point on an axis of said base, said pivot point being near a bottom plane of said base;
   a reference card, said reference card including a spherical sector, at least one concentric circle on a top surface of said spherical sector, a cylindrical skirt extending downwardly from said spherical sector coaxial therewith, an axially extending pivot pin extending downwardly from said spherical sector and pivotable about said pivot point on said base with only an end portion of said pivot pin extending below said skirt;
   said cylindrical skirt of said card including different color panels having circumferential widths of 45° each with each alternate panel having the same color, each said color panel including a vertically extending centerline of a color different from that of said color panel to divide each said different color panel into equal segments of $22\frac{1}{2}°$, each of said color segments of said skirt includes a different colored dot on its center with each color dot separated by $22\frac{1}{2}°$;
   an open-ended dome enclosing said reference card, said dome including an indicia on its axis coaxial with said reference card, a heavy vertically extending line affixed onto said dome and extending toward said indicia thereon;
   a damping fluid within said dome with said open end of said dome sealed to said base to prevent leakage of said fluid, said base including an outwardly extending skirt surrounding said open end of said dome; and
   a base plate whereby said base of said wind tracking device fits into said base plate with a snap fit for relative rotation thereon.

2. An adjustable wind tracking device as claimed in claim 1 in which
   said reference card has two concentric circles thereon.

* * * * *